(No Model.)
A. R. BYRKETT.
EARTH SCRAPER.
No. 273,253. Patented Mar. 6, 1883.
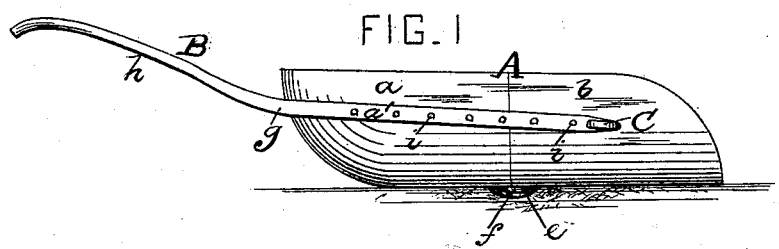
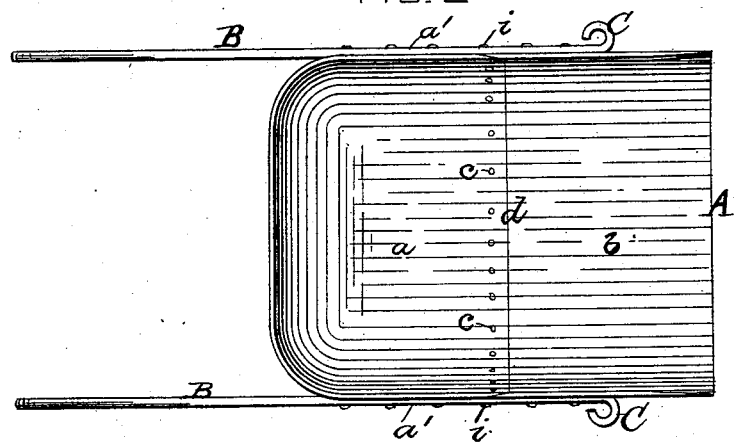
WITNESSES:
INVENTOR
Ahijah R. Byrkett
By Chas J. Gooch
Attorney

UNITED STATES PATENT OFFICE.

AHIJAH R. BYRKETT, OF TROY, OHIO.

EARTH-SCRAPER.

SPECIFICATION forming part of Letters Patent No. 273,253, dated March 6, 1883.

Application filed January 18, 1882. (No model.)

*To all whom it may concern:*

Be it known that I, AHIJAH R. BYRKETT, a citizen of the United States of America, residing at Troy, in the county of Miami and State of Ohio, have invented certain new and useful Improvements in Earth-Scrapers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain improvements in dumping-scrapers; and it consists in the combination, with a scoop formed of two pieces of metal joined by a transverse seam, of a handle and scraper-axle for each side thereof, formed from a single piece of metal, said handles extending longitudinally along and being riveted to the scoop and across the seam, as hereinafter described and claimed.

In the drawings, Figure 1 represents a side elevation of a scoop having my improved handle and scraper-axle applied thereto. Fig. 2 is a plan view of a scoop, showing both handles and scraper-axles in position.

A represents a scoop or scraper-body swaged out of two pieces of metal, $a\ b$, joined together by rivets $c$ at the transverse center $d$, and having runners $e$, of bow shape, and supporting blocks or dogs $f$, as described in a former patent granted to me.

B B represent the handles, and C C the axles, of the scraper. Each handle and axle is formed, by swaging or in any other suitable or desired manner, out of a single piece of metal. At the front ends the pivotal axles C, to which the rear ends of the bail are attached, are formed of hook shape, to admit of the bail being readily attached thereto. When the bail is attached the ends of these hooks may be turned down or inward, so as to securely hold the bail therein. Rearwardly from these axles C, upon which the scoop or bowl turns upon being dumped, the handles extend in a straight or nearly straight line, $a'$, across the seam $d$, to the rear of the bowl. From thence they curve upwardly a short distance, as at $g$, to give them a proper elevation from the ground, and then gently curve upward and downward, as at $h$, to adapt them to be readily held and grasped by the workman in guiding and dumping the scoop. The straight portion $a'$ of each handle, it will be observed, extends from the rear of the bowl or scoop across the seam $d$ and along the front member of the bowl, to the position at which the bail should be attached, and is firmly riveted at $i$ to the side of the bowl or scoop. By thus extending the handles along each side of the bowl, from the rear clear to the front portion, to which the bail is attached, and riveting the handles firmly to the bowl-sides, I secure an exceedingly strong and durable scraper, as the handles brace the sides of the bowl, and thereby strengthen it very materially. By forming the pivotal axles upon the forward ends of the handles themselves, a ready means of attachment for the bail is secured without weakening or inducing fracture of the scoop at the point of its attachment, as might be the case were the bail secured directly to the scoop or bowl, as the strain in draft is taken up by the axles C and the handles B and cannot have any injurious effect upon the bowl, owing to the rigid attachment and bracing quality of the handles relatively to the scoop.

Dumping-scrapers constructed in accordance with this invention can be very readily and cheaply produced. They are very simple in construction, efficient in action, strong, and adapted to receive a large amount of rough usage without affecting their working qualities. There are no parts to get out of order or break off. A continuous support is afforded each side of the bowl throughout its length, from the rear to the point of the bail attachment, which renders it much stronger than when the handles are not riveted to the scoop and do not extend from the rear to the point of connection with the bail, as in the present invention.

Having thus described my invention, what I claim is—

1. An earth-scraper consisting of a scoop formed of two pieces of metal riveted together transversely of their length, and handles extending at their forward ends longitudinally along and riveted to the scoop and across the seam, and having bail-attaching ears at their extreme front ends, substantially as and for the purpose shown and described.

2. A dumping-scraper consisting of the scoop A, formed of two pieces of metal, $a\,b$, riveted together at $c$, and having runners $e$ and dogs $f$, handles B, extending along and riveted to the sides of the scoop at $a'\,i$, and the pivotal axles C, formed integrally with said handles, substantially as and for the purpose shown and described.

In testimony whereof I affix my signature in presence of two witnesses.

AHIJAH R. BYRKETT.

Witnesses:
CHAS. J. GOOCH,
GEO. F. GRAHAM.